(12) United States Patent
Vilajosana et al.

(10) Patent No.: US 11,188,275 B2
(45) Date of Patent: Nov. 30, 2021

(54) ANTICIPATING MAINTENANCE IN A PRINTING DEVICE

(71) Applicant: HEWLETT-PACKARD DEVELOPMENT COMPANY, L.P., Houston, TX (US)

(72) Inventors: Xavier Vilajosana, Sant Cugat del Valles (ES); Pere Tuset, San Cugat del Valles (ES); Pol Fornos, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 868 days.

(21) Appl. No.: 15/533,514

(22) PCT Filed: Jan. 13, 2015

(86) PCT No.: PCT/US2015/011109
§ 371 (c)(1),
(2) Date: Jun. 6, 2017

(87) PCT Pub. No.: WO2016/114759
PCT Pub. Date: Jul. 21, 2016

(65) Prior Publication Data
US 2017/0344314 A1 Nov. 30, 2017

(51) Int. Cl.
*G06F 3/12* (2006.01)
*B41J 29/38* (2006.01)
*B41J 19/00* (2006.01)
*B41J 29/393* (2006.01)
*B41J 29/46* (2006.01)
*G06F 17/15* (2006.01)

(52) U.S. Cl.
CPC .............. *G06F 3/121* (2013.01); *B41J 19/00* (2013.01); *B41J 29/38* (2013.01); *B41J 29/393* (2013.01); *B41J 29/46* (2013.01); *G06F 17/15* (2013.01)

(58) Field of Classification Search
None
See application file for complete search history.

(56) References Cited

U.S. PATENT DOCUMENTS

| 4,517,503 | A | 5/1985 | Lin et al. |
| 5,331,680 | A | 7/1994 | Ueno |
| 5,894,315 | A | 4/1999 | Yamane |
| 6,224,183 | B1 | 5/2001 | Kono et al. |
| 6,461,064 | B1* | 10/2002 | Leonard ................... B41J 11/42 347/33 |
| 7,014,289 | B1 | 3/2006 | Matsuda |
| 7,096,158 | B2* | 8/2006 | Kitada .................. G06F 3/1207 702/182 |

(Continued)

FOREIGN PATENT DOCUMENTS

EP 0452497 7/1996

*Primary Examiner* — Aditya S Bhat
(74) *Attorney, Agent, or Firm* — HP Inc. Patent Department

(57) ABSTRACT

In an example, a method of anticipating maintenance in a printing device includes determining an inertial reference signal of a printer carriage and measuring a current inertial signal of the printer carriage. The method includes cross-correlating the inertial reference signal with the current inertial signal and determining from the cross-correlating when the current inertial signal is not within a preset confidence interval of the inertial reference signal.

15 Claims, 3 Drawing Sheets

(56) References Cited

U.S. PATENT DOCUMENTS

| | | | |
|---|---|---|---|
| 7,101,015 B2* | 9/2006 | Jun | B41J 19/202 |
| | | | 347/19 |
| 8,326,162 B2 | 12/2012 | DeJong et al. | |
| 8,573,727 B2 | 11/2013 | Iwai | |
| 2002/0193191 A1 | 12/2002 | Downing et al. | |
| 2003/0077097 A1* | 4/2003 | Parry | G06F 3/121 |
| | | | 400/74 |
| 2013/0076822 A1* | 3/2013 | Ogimura | B41J 29/38 |
| | | | 347/14 |
| 2013/0135373 A1 | 5/2013 | Price | |

* cited by examiner

ANTICIPATING MAINTENANCE IN A PRINTING DEVICE

BACKGROUND

High quality print output from printing devices depends in part on the proper maintenance of such devices. Many printing devices have moving parts that can deteriorate over time as the devices age and continue to generate printed output. Even the most reliable printers have components that can wear out. The wearing out of printer components eventually leads to reduced print quality from a printer. Unfortunately, the maintenance of some printer components is often overlooked or postponed until noticeable problems appear with the quality of the printed output.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
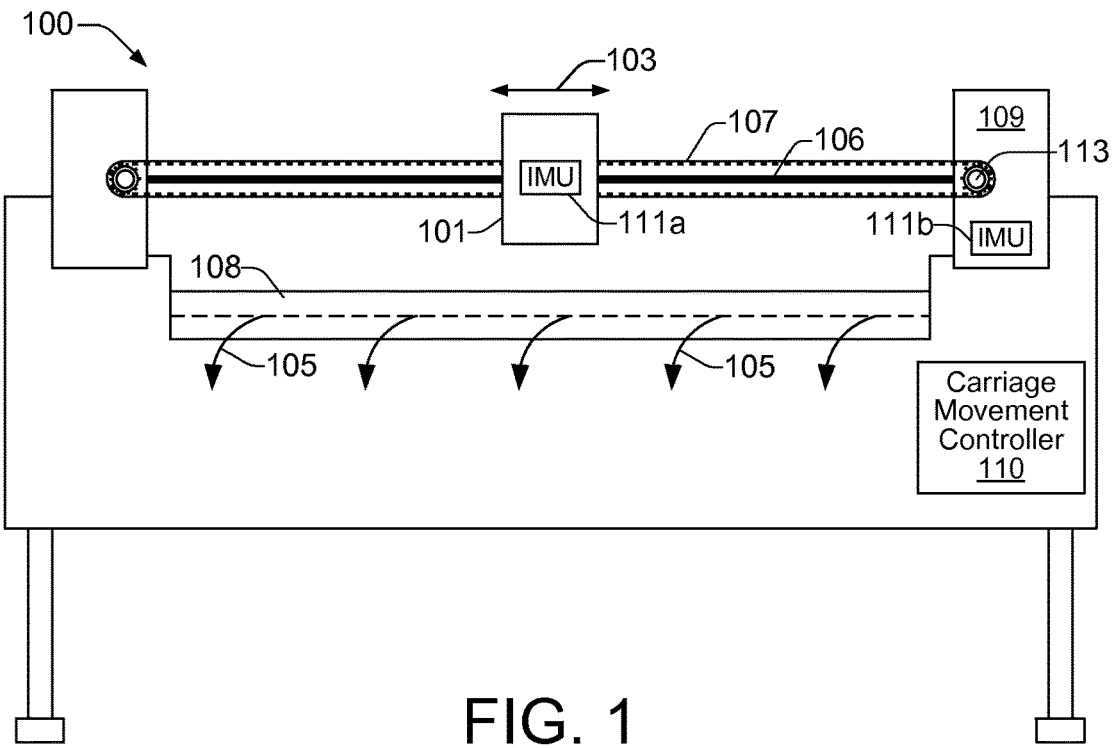
FIG. 1 shows an example of an inkjet printing system implemented as a scanning type inkjet printing device suitable for anticipating maintenance within the device.

Printing devices include components that can deteriorate or be otherwise compromised over time through regular use. A failure to properly maintain such components can lead to reduced print quality from the printing devices. Printer components that are associated with and/or contribute to repetitive motions during the printing process can be particularly prone to such wear and deterioration. For example, in "multi-pass" inkjet printers that employ a scanning printer carriage (i.e., as opposed to "single-pass", page-wide printers), various components contribute to the motion of the carriage as it scans back and forth across the width of the print media. The printer carriage transports printheads and/or print cartridges across the print media as they eject ink droplets to form printed swaths on the media during printing. The quality of print from a scanning type printer depends in part on the stable movement of the printer carriage as it slides along the carriage rod and across the width of the media. The deterioration, loosening, repositioning, and so on, of various components within the printer can contribute to an abnormal motion of the carriage.

For example, one component of a scanning type inkjet printer that can experience deterioration over time is the carriage belt. The carriage belt often comprises a toothed belt formed in a loop that extends across the width of the print media platform to draw the printer carriage back and forth across the media. In some printers, the carriage belt is coupled at one side of the media platform to a rotary drive shaft of a reversible stepping motor. The reversible stepping motor drives the belt in forward and reverse directions. The carriage belt can be formed of plastic or other material that can degrade over time with extended use. In particular, the teeth on the belt that engage the printer carriage and/or the drive motor shaft can deteriorate to the extent that there is slippage between the belt and the drive motor shaft and/or the printer carriage. This belt slippage can impact movement of the printer carriage as it slides along the carriage rod, and can result in the printer carriage being slightly out of location along the media width direction when ink is being ejected from print cartridges held within the carriage. As the carriage belt continues to deteriorate in this manner, print quality begins to suffer.

Accordingly, abnormal motion of a printer carriage can provide an indication that components associated with the carriage movement have deteriorated or are defective. Prior efforts to determine abnormal motions of a printer carriage involve performing static friction tests to detect increments of friction on the carriage and associated rotary parts. Such a process can be performed during assembly and calibration of the printer, or subsequently by an operator after the printer is already installed and operational. However, this and other processes and mechanisms do not provide for continuously monitoring the health of related printer subsystems by means of device behavior characterization and real-time feedback.

In contrast to prior processes and mechanisms for detecting abnormal printer carriage motions and the potential that associated carriage components may be defective or deteriorated, examples discussed herein enable real-time monitoring of carriage motion and early detection of abnormal motions that may be indicative of component failures and/or deterioration and other printer misbehaviors. In a normal printing operation, the printer carriage is subject to different characteristic vibration due to the influence of moving parts, motors, and friction. Modal analysis of the carriage acceleration, velocity and displacement can be used to determine abnormal operation and anticipate prominent failures. The anticipation of failures enables predictive maintenance and/or adjustments to the print engine which can preempt noticeable breakdown in printing quality.

In one example, a method of anticipating maintenance in a printing device includes determining an inertial reference signal of a printer carriage, measuring a current inertial signal of the printer carriage, and cross-correlating the inertial reference signal with the current inertial signal. The method includes determining a malfunction when the current inertial signal is not within a preset confidence interval.

In another example, a printing device is capable of anticipating maintenance. The printing device includes an inertial measurement unit (IMU) to measure an inertial component of a carriage during a carriage pass from one edge to another edge of a print media. The device includes a sample module to store a carriage pass signature from the sample values of the inertial component. The carriage pass signature characterizes the movement of the carriage passing across the media. The device also includes a cross-correlator to cross-correlate the carriage pass signature with a reference signature and determine a malfunction when the carriage pass signature is not within a preset confidence interval of the reference signature.

In another example, a non-transitory processor-readable medium stores code representing instructions that when executed by a processor of a printing device cause the printing device to measure an inertial signal of a printer carriage and to compare the inertial signal with a reference signal. The printing device anticipates maintenance for itself when the inertial signal does not fall within a confidence interval of the reference signal.

FIG. 1 shows an example of an inkjet printing system 100. The printing system 100, also variously referred to as printing device 100, is implemented as a scanning type printer 100. In a scanning type inkjet printer 100, a printer carriage 101 is supported on a mounting assembly 106. The mounting assembly 106 comprises a carriage rod 106, along which the carriage 101 is driven back and forth, from one side of the rod 106 to the other. The carriage 101 conveys or scans an inkjet printhead assembly 102 (FIG. 2) back and forth across the width of a print media page 118 (FIG. 2) in a manner indicated by bi-directional arrow 103. Thus, inkjet printhead assembly 102 scans in a generally horizontal manner that is orthogonal to the media advance direction 105.

The printer carriage 101 is affixed to and carried by a toothed belt 107 along the carriage rod 106, scanning across the width of a media page 118. The toothed belt 107 is driven in forward and reverse directions by a reversible stepping carriage motor 109. In some examples the printer carriage 101 can include an inertial measurement unit (IMU) 111a. The IMU 111a can include, for example, an accelerometer 111a to sense and/or measure the acceleration of the carriage 101 at any incremental point in time as the carriage 101 moves along carriage rod 106. In some examples, the IMU 111a can include other devices such as a range sensor or other sensing device that can be used to determine displacement, velocity or acceleration. Thus, measuring an inertial component can generally include measuring acceleration, velocity, and displacement. An accelerometer 111a can measure acceleration of the carriage 101 in any direction within three-dimensional space, such as any X, Y, and Z direction. Thus, the acceleration of carriage 101 can be sensed and measured in horizontal directions (i.e., left and right) indicated by the bi-directional arrow 103 while the carriage travels along the carriage rod 106. In addition, the acceleration of carriage 101 can be sensed and measured in upward and downward directions, as well as in forward and backward directions, as it vibrates during its motion along the carriage rod 106. In some examples, the carriage motor 109 can include an inertial measurement unit (IMU) 111b. IMU 111b can include a linear position encoder 111b as part of the carriage motor 109. In other examples, IMU 111b can include other sensors such as a range sensor. A position encoder 111b can provide a count of the number of motor advancements, or "ticks", in a given amount of time. Each tick represents a certain distance of advancement, and a tick count enables a calculation of the acceleration, velocity, and position of the toothed belt 107 being driven by the motor's drive shaft 113.

During a printing operation, the printer carriage 101 is subject to different characteristic vibration due to the influence of moving parts, the motor 109, and friction. Acceleration, velocity and displacement modal analysis of the carriage 101 can be used to determine abnormal operation and to anticipate maintenance of printer components that can avoid prominent failures. That is, analysis of data gathered from IMU's such as IMU 111a and 111b enables the detection of subtle variations in movement behavior of the carriage 101 that can be used to anticipate failures as well as potential maintenance actions that can be taken to avoid such failures. Anticipating maintenance of components within a printing device 100 can improve overall printing quality.

As discussed below in greater detail with respect to FIG. 2, printing device 100 includes a carriage movement controller 110 to gather data from IMU's 111a and/or 111b, generate a carriage scan pass signal from the data, compare the carriage scan pass signal with a reference signal that represents an optimal behavior, and determine from the comparison if the carriage pass signal falls within a preset/programmable confidence interval of the reference signal. Carriage pass signals falling outside of the confidence interval can be reported and used as a way to anticipate maintenance on various components within the printing device 100.

Figure 2:
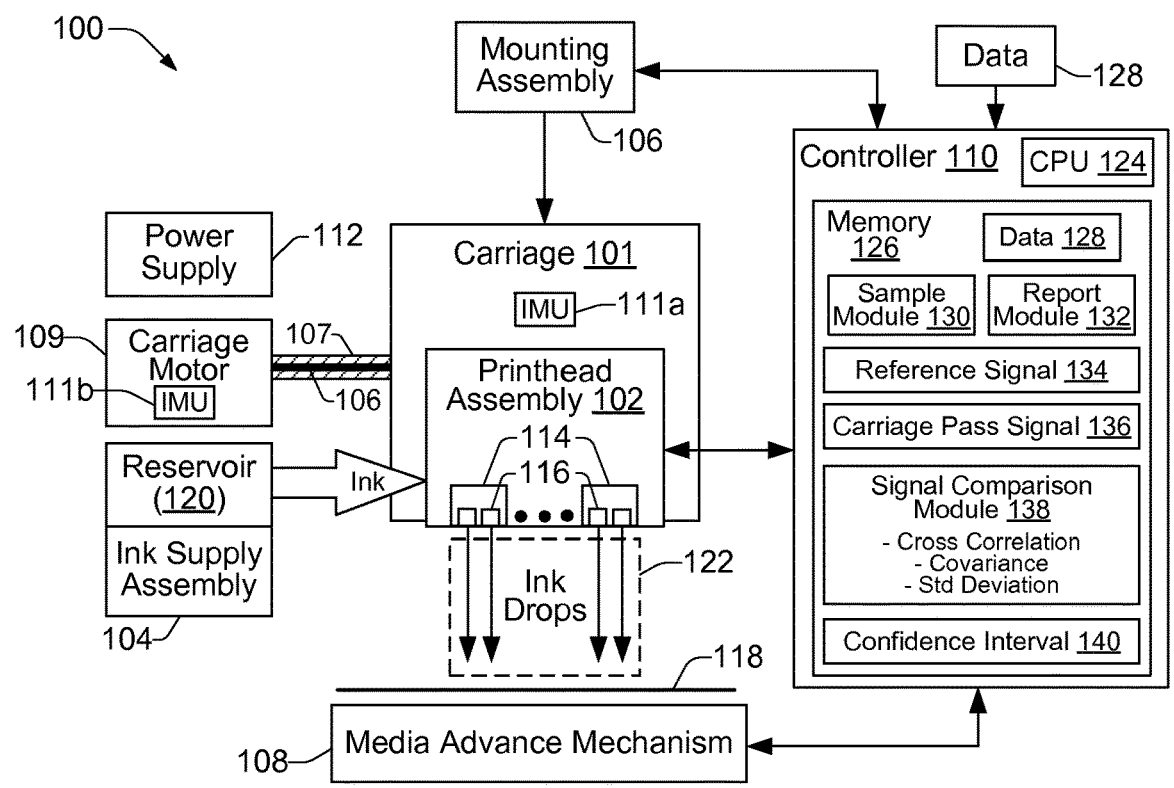
FIG. 2 shows a block diagram of an example inkjet printing device such as the example inkjet printing device of FIG. 1.

FIG. 2 illustrates a block diagram of the example inkjet printing device 100 of FIG. 1. In this example printing device 100, a fluid ejection assembly is disclosed as a fluid drop jetting printhead 114. Inkjet printing device 100 includes carriage 101, inkjet printhead assembly 102, ink supply assembly 104, mounting assembly 106 (i.e., carriage rod 106), toothed belt 107, media advance mechanism 108, carriage motor 109, controller 110, and at least one power supply 112 that provides power to the various electrical components of the printing device 100. Printhead assembly 102 includes at least one fluid ejection assembly 114 (i.e., printhead 114) having a printhead die that ejects drops of ink through a plurality of orifices or nozzles 116 toward a media page 118 so as to print onto the media page 118. A media page 118 can be any type of suitable print medium sheet material, such as paper, card stock, transparencies, Mylar, and the like. Typically, nozzles 116 are arranged on a printhead die in one or more columns or arrays such that properly sequenced ejection of ink from nozzles 116 causes characters, symbols, and/or other graphics or images to be printed upon a media page 118 as the printhead assembly 102 and the media page 118 are moved relative to each other.

Ink supply assembly 104 supplies fluid ink to printhead assembly 102 and includes a reservoir 120 for storing ink. Ink flows from reservoir 120 to printhead assembly 102. Ink supply assembly 104 and printhead assembly 102 can form a one-way ink delivery system or a recirculating ink delivery system. In a one-way ink delivery system, substantially all of the ink supplied to printhead assembly 102 is consumed during printing. In a recirculating ink delivery system, however, only a portion of the ink supplied to printhead assembly 102 is consumed during printing. Ink not consumed during printing is returned to ink supply assembly 104.

In some examples, printhead assembly 102 and ink supply assembly 104 are housed together in an inkjet cartridge or pen. In this case, reservoir 120 includes a local reservoir located within the cartridge, but may also include a larger reservoir located separately from the cartridge to refill the local reservoir through an interface connection, such as a supply tube. In other examples, ink supply assembly 104 is separate from printhead assembly 102 and supplies ink to printhead assembly 102 through an interface connection. In either case, reservoir 120 of ink supply assembly 104 may be removed, replaced, and/or refilled.

Mounting assembly 106 helps to position printhead assembly 102 relative to media advance mechanism 108, and media advance mechanism 108 positions media page 118 relative to printhead assembly 102. Thus, a print zone 122 is defined adjacent to nozzles 116 in an area between the printhead assembly 102 and media page 118. As noted, in this example printing device 100 is a scanning type printer where printhead assembly 102 is a scanning printhead assembly carried by a carriage 101 that moves printhead assembly 102 in a generally horizontal manner which is orthogonal relative to the media page 118 being advanced by media advance mechanism 108. The carriage 101 scans printhead assembly 102 with printhead(s) 114 back and forth across the width of media page 118 in forward and reverse passes in directions 103. Media advance mechanism 108 positions a media page 118 relative to printhead assembly 102 by moving the media page 118 along a print media path in a direction 105 that is orthogonal to the horizontal movement of the printhead assembly 102.

Media advance mechanism 108 can include various mechanisms (not shown in FIGS. 1 and 2) that assist in advancing a media page 118 through a media path of printing device 100. These can include, for example, various media advance rollers, and a motor, such as a DC servo motor or a stepper motor to power the media advance rollers. In some implementations, a media advance mechanism 108 might include other or additional mechanisms to advance a media page 118, such as a moving platform.

Referring to both FIGS. 1 and 2, controller 110 includes a processor (CPU) 124, a memory 126, firmware, and other printer electronics for communicating with and controlling inkjet printhead assembly 102, mounting assembly 106, and media advance mechanism 108. Memory 126 can include both volatile (i.e., RAM) and nonvolatile (e.g., ROM, hard disk, optical disc, CD-ROM, magnetic tape, flash memory, etc.) memory components. The components of memory 126 comprise non-transitory, machine-readable (e.g., computer/processor-readable) media that provide for the storage of machine-readable coded program instructions, data structures, program instruction modules, JDF (job definition format), and other data and modules for the printing device 100, such as data and modules 128, 130, 132, 134, 136, 138, and 140. The program instructions, data structures, and modules stored in memory 126 may be part of an installation package that can be executed by processor 124 to implement various examples, such as examples discussed herein. Thus, memory 126 may be a portable medium such as a CD, DVD, or flash drive, or a memory maintained by a server from which the installation package can be downloaded and installed. In another example, the program instructions, data structures, and modules stored in memory 126 may be part of an application or applications already installed, in which case memory 126 may include integrated memory such as a hard drive.

Controller 110 receives data 128 from a host system, such as a computer, and stores the data 128 in memory 126. Typically, data 128 is sent to printing device 100 along an electronic, infrared, optical, or other information transfer path. Data 128 represents, for example, a document or image file to be printed. As such, data 128 forms a print job for printing device 100 that includes one or more print job commands and/or command parameters. Using data 128, controller 110 controls printhead assembly 102 to eject ink drops from nozzles 116. Thus, controller 110 defines a pattern of ejected ink drops that form characters, symbols, and/or other graphics or images on media page 118. The pattern of ejected ink drops is determined by the print job commands and/or command parameters from data 128.

In one example, controller 110 includes sample module 130. Sample module 130 executes on processor 124 to control IMU's, such as IMU's 111a and 111b, and to retrieve sample inertial measurement values from the IMU's. For example, sample module 130 can execute to control IMU 111a to take a number of acceleration measurements of carriage 101 as the carriage scans or passes across a media page 118 along the carriage rod 106. Sample module 130 combines measured acceleration values from IMU 111a into an inertial carriage scan pass signal 136 and stores the carriage pass signal 136 in memory 126. The carriage pass signal 136 characterizes the carriage movement along the carriage rod 106 (and across the media page 118) as acceleration signals, velocity signals, and or displacement signals. A carriage pass signal 136 can include multiple signals 136 representing, for example, acceleration, velocity, and displacement of the carriage 101 in various directions within 3-dimentional space (i.e., in X, Y, and Z directions). In some examples, the sample module 130 combines measured acceleration values for different portions of a carriage scan. For example, small sections of a carriage scan movement can be characterized instead of an entire scan. This is useful to reduce processing requirements for processing the acceleration data. The resolution of acceleration data across a carriage scan can be very high. For example, if an accelerometer 111a provides 10,000 samples per second, it is useful to break up the carriage scan into smaller portions and analyze the acceleration data from each portion.

A signal comparison module 138 provides an analysis of a carriage pass signal 136 by comparing the carriage pass signal 136 with an optimal, or expected, inertial reference signal 134. An inertial reference signal 134 represents movement of the carriage 101 at a time when such movement was known to be optimal, such as when the printing device 100 was calibrated in the factory, or when it was first operated by a user. The reference signal 134 can be generated and stored in memory 126 during calibration at the time the printing device 100 is manufactured, or at some other time such as when a user first operates the printing device 100. For example, a user can generate the reference signal 134 by sampling acceleration values over the first 100 carriage scans, and averaging the acceleration data. The averaged signal can be stored in memory 126 as the reference signal 134 and will represent the inertial characteristics of the carriage at a time when the printing device 100 is new and its internal components are not worn or deteriorated from repeated use.

In one example, the signal comparison module 138 cross-correlates the carriage pass signal 136 with the reference signal 134 to determine how closely the signals match one another. Once the carriage pass signal 136 and reference signal 134 are correlated, the comparison module 138 determines if the carriage pass signal 136 falls within a preset (e.g., user-programmed) confidence interval 140 of the reference signal 134. If the carriage pass signal 136 falls within the confidence interval 140, it can be determined that the motion of the carriage 101 during the scan pass is the same as, or close to, the reference signal 134 and that no report should be made regarding maintenance of printing device components. However, if the carriage pass signal 136 falls outside of the confidence interval 140, it can be determined that the motion of the carriage 101 during the scan pass is different than the reference signal 134 to an extent that a report should be made regarding maintenance of printing device components. In such a case, report module 132 executes to generate a report that anticipates performing maintenance on components of printing device 100, and outputting the report to a user interface of the printing device 100. In some examples, a confidence interval 140 can be set to 95%. In some examples, the signal comparison module 138 can compare the carriage pass signal 136 with the reference signal 134 using other mathematical and/or statistical methods, such as finding the covariance between the signals, finding the standard deviation between the signals, and so on.

Figure 3:
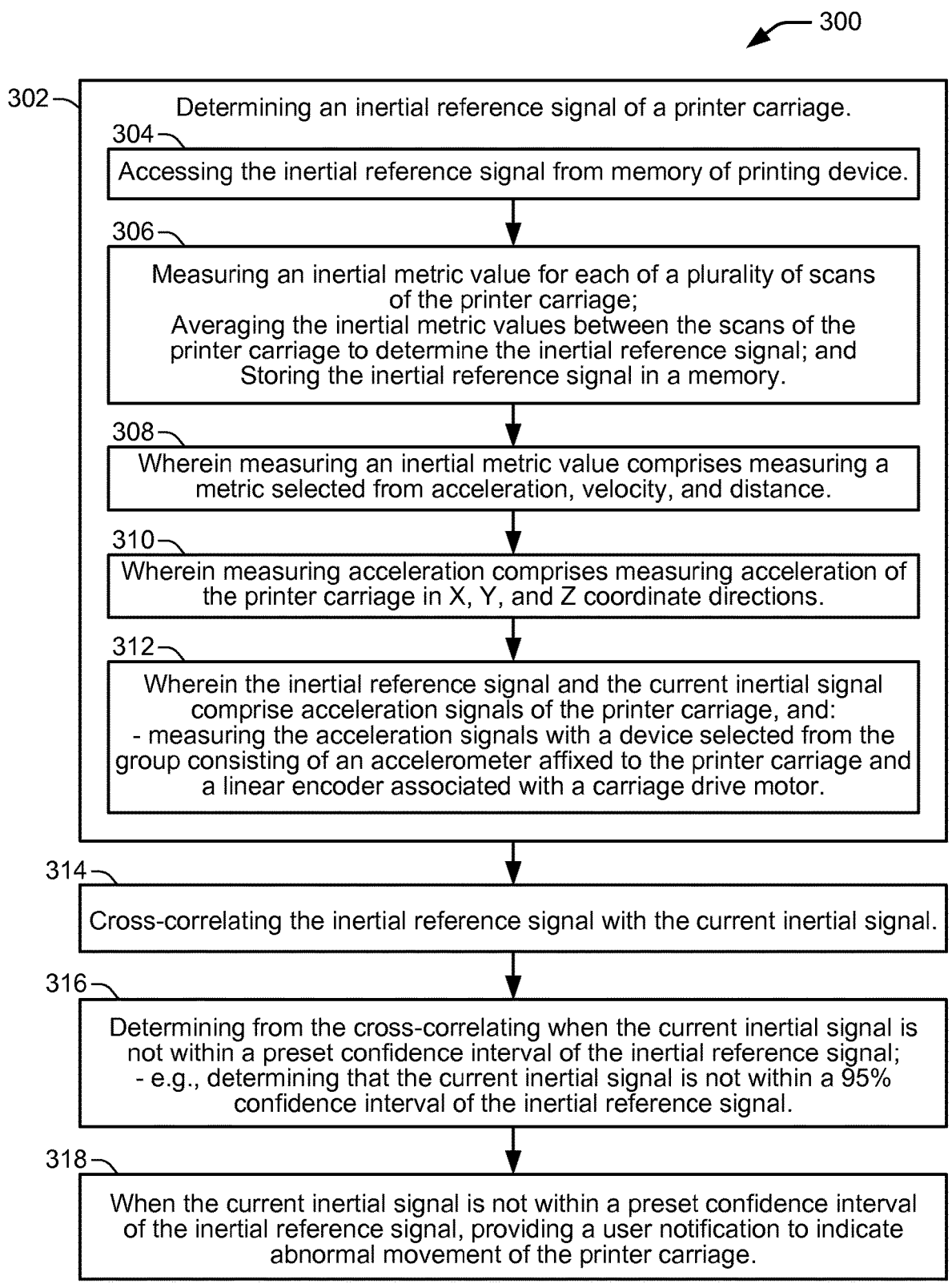
FIG. 3 shows a flow diagram that illustrates an example method related to anticipating maintenance in a printing device.
Figure 4:
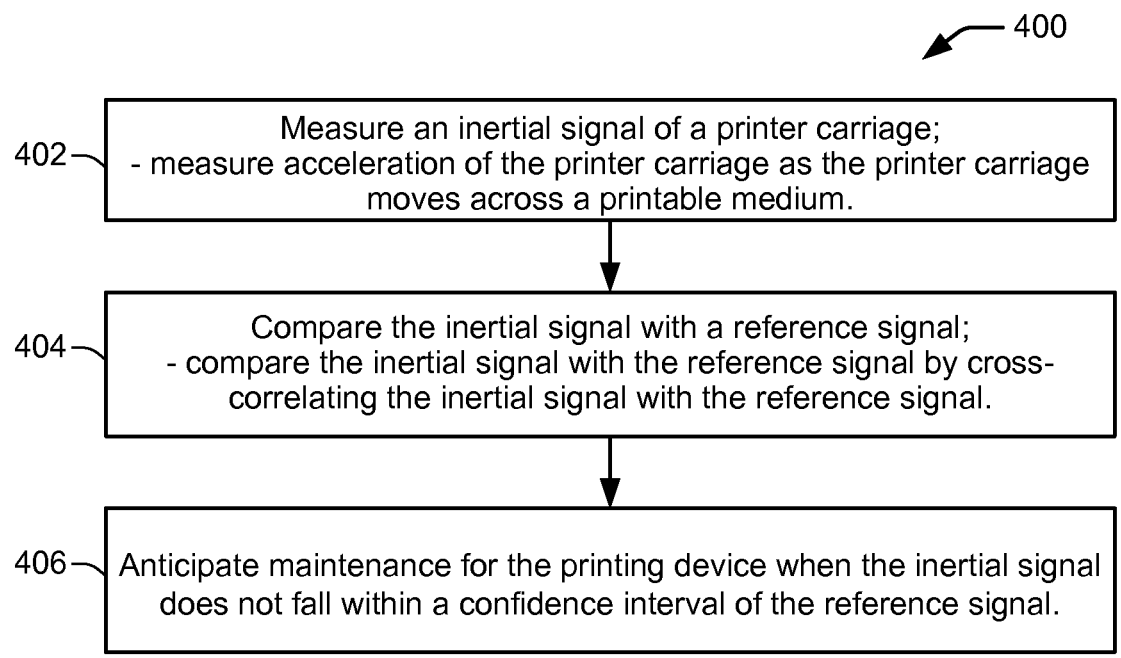
FIG. 4 shows another flow diagram that illustrates an example method related to anticipating maintenance in a printing device.

FIGS. 3 and 4 show flow diagrams that illustrate example methods 300 and 400, respectively, related to anticipating maintenance in a printing device, such as an inkjet printing device 100. Methods 300 and 400 are associated with the examples discussed above with regard to FIGS. 1 and 2, and details of the operations shown in methods 300 and 400 can be found in the related discussion of such examples. The operations of methods 300 and 400 may be embodied as programming instructions stored on a non-transitory, machine-readable (e.g., computer/processor-readable) medium, such as the memory 126 shown in FIG. 2. In some examples, implementing the operations of methods 300 and 400 can be achieved by a processor, such as a processor 124 shown in FIG. 2, reading and executing the programming instructions stored in a memory 126. In some examples, implementing the operations of methods 300 and 400 can be achieved using an ASIC (application specific integrated circuit) and/or other hardware components alone or in combination with programming instructions executable by a processor 124.

In some examples, methods 300 and 400 may include more than one implementation, and different implementations of methods 300 and 400 may not employ every operation presented in the respective flow diagrams. Therefore, while the operations of methods 300 and 400 are presented in a particular order within the flow diagrams, the order of their presentation is not intended to be a limitation as to the order in which the operations may actually be implemented, or as to whether all of the operations may be implemented. For example, one implementation of method 300 might be achieved through the performance of a number of initial operations, without performing one or more subsequent operations, while another implementation of method 300 might be achieved through the performance of all of the operations.

Referring now to the flow diagram of FIG. 3, an example method 300 of anticipating maintenance in a printing device begins at block 302, with determining an inertial reference signal of a printer carriage. As shown at block 304, determining an inertial reference signal can include accessing the inertial reference signal from a memory of the printing device. In some examples, as shown at block 306, determining an inertial reference signal can include measuring an inertial metric value for each of a plurality of scans of the printer carriage, averaging the inertial metric values between the scans of the printer carriage to determine the inertial reference signal, and then storing the inertial reference signal in a memory. Measuring an inertial metric value can include measuring a metric selected from acceleration, velocity, and distance, as shown at block 308. As shown at block 310, measuring acceleration can include measuring acceleration of the printer carriage in X, Y, and Z coordinate directions, or in 3-dimensional space.

In some examples where the inertial reference signal and the current inertial signal comprise acceleration signals of the printer carriage, the method can include measuring the acceleration signals with a device selected from the group consisting of an accelerometer affixed to the printer carriage and a linear encoder associated with a carriage drive motor, as shown at block 312. As shown at block 314, the method 300 continues with cross-correlating the inertial reference signal with the current inertial signal. As shown at block 316, the method 300 can include determining from the cross-correlating when the current inertial signal is not within a preset confidence interval of the inertial reference signal (e.g., determining that the current inertial signal is not within a 95% confidence interval of the inertial reference signal). As shown at block 318, when the current inertial signal is not within a preset confidence interval of the inertial reference signal, the method 300 can include providing a user notification to indicate abnormal movement of the printer carriage.

Referring now to the flow diagram of FIG. 4, an example method 400 related to anticipating maintenance in a printing device begins at block 402, with measuring an inertial signal of a printer carriage. In some examples, measuring an inertial signal of a printer carriage can include measuring acceleration of the printer carriage as the printer carriage moves across a printable medium. As shown at block 404, the method 400 includes comparing the inertial signal with a reference signal. In some examples, comparing the inertial signal with a reference signal includes comparing the inertial signal with the reference signal by cross-correlating the inertial signal with the reference signal. As shown at block 406, the method 400 includes anticipating maintenance to be performed for the printing device when the inertial signal does not fall within a confidence interval of the reference signal.

What is claimed is:

1. A method of anticipating maintenance in a printing device, the method comprising:
   determining an inertial reference signal of a printer carriage;
   measuring a current inertial signal of the printer carriage;
   cross-correlating the inertial reference signal with the current inertial signal; and
   determining from the cross-correlating when the current inertial signal is not within a preset confidence interval of the inertial reference signal.

2. A method as in claim 1, wherein determining an inertial reference signal comprises accessing the inertial reference signal from a memory of the printing device.

3. A method as in claim 1, wherein determining an inertial reference signal comprises:
   measuring an inertial metric value for each of a plurality of scans of the printer carriage;
   averaging the inertial metric values between the scans of the printer carriage to determine the inertial reference signal; and
   storing the inertial reference signal in a memory.

4. A method as in claim 3, wherein measuring an inertial metric value comprises measuring a metric selected from the group consisting of acceleration, velocity, and distance.

5. A method as in claim 4, wherein measuring an inertial metric value comprises measuring the inertial metric value of the printer carriage in X, Y, and Z coordinate directions.

6. A method as in claim 1, further comprising:
   when the current inertial signal is not within a preset confidence interval of the inertial reference signal, providing a user notification to indicate abnormal movement of the printer carriage.

7. A method as in claim 1, wherein determining from the cross-correlating when the current inertial signal is not within a preset confidence interval of the inertial reference signal comprises determining that the current inertial signal is not within a 95% confidence interval of the inertial reference signal.

8. A method as in claim 1, wherein the inertial reference signal and the current inertial signal comprise acceleration signals of the printer carriage, the method comprising:
   measuring the acceleration signals with a device selected from the group consisting of an accelerometer affixed to the printer carriage and a linear encoder associated with a carriage drive motor.

9. A printing device capable of anticipating maintenance, comprising:
   an inertial measurement unit (IMU) to measure an inertial component of a carriage as the carriage passes from one edge to another edge of a print media;

a sample module to store a carriage pass signal formed from sample values provided by the IMU, the carriage pass signal characterizing movement of the carriage across the print media; and a cross-correlator to cross-correlate the carriage pass signal with a reference signal and determine a malfunction when the carriage pass signal is not within a preset confidence interval of the reference signal.

10. A printing device as in claim 9, further comprising a reporting module to report the malfunction to a user interface.

11. A printing device as in claim 9, further comprising:

a toothed belt to transport the carriage between edges of the print media; and, a carriage motor to drive the toothed belt.

12. A printing device as in claim 11, wherein the IMU comprises a device selected from the group consisting of an accelerometer affixed to the carriage and a linear encoder associated with the carriage motor.

13. A non-transitory processor-readable medium storing code representing instructions that when executed by a processor of a printing device cause the printing device to:

measure an inertial signal of a printer carriage;

compare the inertial signal with a reference signal; and anticipate maintenance for the printing device when the inertial signal does not fall within a confidence interval of the reference signal.

14. A non-transitory processor-readable medium as in claim 13, wherein measuring the inertial signal comprises measuring acceleration of the printer carriage as the printer carriage moves across a printable medium.

15. A non-transitory processor-readable medium as in claim 13, wherein comparing the inertial signal with the reference signal comprises comparing the inertial signal with the reference signal by cross-correlating the inertial signal with the reference signal.

* * * * *